US012448706B2

(12) United States Patent
Piwonski et al.

(10) Patent No.: US 12,448,706 B2
(45) Date of Patent: Oct. 21, 2025

(54) TEXTILE FABRIC

(71) Applicant: iprotex GmbH & Co. KG, Münchberg (DE)

(72) Inventors: Timo Piwonski, Münchberg (DE); Bernd Wyrwis, Münchberg (DE)

(73) Assignee: IPROTEX GMBH & CO. KG, Münchberg (DE)

( * ) Notice: Subject to any disclaimer, the term of this patent is extended or adjusted under 35 U.S.C. 154(b) by 0 days.

(21) Appl. No.: 18/599,467

(22) Filed: Mar. 8, 2024

(65) Prior Publication Data

US 2024/0301596 A1 Sep. 12, 2024

(30) Foreign Application Priority Data

Mar. 10, 2023 (DE) ..................... 10 2023 202 211.7
Apr. 6, 2023 (DE) ..................... 10 2023 108 966.8

(51) Int. Cl.
*D03D 3/08* (2006.01)
*D03D 13/00* (2006.01)
(Continued)

(52) U.S. Cl.
CPC ............. *D03D 13/004* (2013.01); *D03D 3/08* (2013.01); *H01B 7/18* (2013.01)

(58) Field of Classification Search
CPC ........ D03D 13/004; D03D 3/08; D03D 11/02; H01B 7/18
See application file for complete search history.

(56) References Cited

U.S. PATENT DOCUMENTS 3,015,149 A * 1/1962 Foster .................... D03D 27/00 428/95
3,234,972 A * 2/1966 Koppelman ........... D03D 11/02 139/384 R
(Continued)

FOREIGN PATENT DOCUMENTS

DE 3220709 A1 12/1983
DE 102009044740 A1 6/2011
(Continued)

OTHER PUBLICATIONS

Search Report for European Application No. EP24161830.5 dated Jul. 4, 2024.

*Primary Examiner* — Robert H Muromoto, Jr.
(74) *Attorney, Agent, or Firm* — Chrisman Gallo Tochtrop LLC

(57) ABSTRACT

The application is directed on a textile fabric, preferably a woven fabric, including a textile fabric-body formed by a first thread group, of longitudinal threads, running in a longitudinal direction of the textile fabric-body, and a second thread group, of transverse threads, running in a transverse direction of the textile fabric-body, the first thread group and the second thread group being linked/combined with each other via the respective longitudinal and transverse threads such that force redirection structures running in the transverse direction are formed (i) alternately on one side and another side of the textile fabric-body with a respective offset in the longitudinal direction, or (ii) on one side of the textile fabric-body with a respective offset in the longitudinal direction, wherein each respective force redirection structure is designed so as to cause, under force application, in particular in a normal direction of the fabric-body, at least a force redirection at least in the longitudinal direction of the textile fabric-body.

6 Claims, 7 Drawing Sheets

(51) Int. Cl.
*H01B 7/18* (2006.01)
*H01B 7/24* (2006.01)

(56) References Cited

U.S. PATENT DOCUMENTS 4,181,450 A * 1/1980 Rasen ..................... E02B 3/126 428/116
4,313,473 A * 2/1982 Reiter .................... D03D 11/02 139/432
4,379,798 A * 4/1983 Palmer .................... B29C 70/24 442/205
4,501,303 A * 2/1985 Osterberg ............. D21F 1/0045 428/221
4,554,953 A * 11/1985 Borel .................... D21F 1/0045 442/205
4,592,396 A * 6/1986 Borel .................... D21F 1/0036 442/205
4,615,256 A * 10/1986 Fukuta ..................... D04C 3/40 87/37
4,725,485 A * 2/1988 Hirokawa ............ D03D 25/005 442/205
4,746,769 A * 5/1988 Piper .................. H01B 11/1033 29/857
4,853,269 A * 8/1989 Fukumori ............... E02B 3/127 428/116
4,922,968 A * 5/1990 Bottger ................. B29C 70/222 139/384 R
4,928,737 A * 5/1990 Borel .................... D21F 1/0036 442/206
4,934,414 A * 6/1990 Borel .................... D21F 1/0036 162/903
4,958,663 A * 9/1990 Miller .................. D03D 25/005 139/384 R
4,981,161 A * 1/1991 Pickering ............. D03D 1/0005 139/432
4,995,429 A * 2/1991 Kositzke ............... D21F 1/0036 162/903
5,014,755 A * 5/1991 Bompard ................ B29C 70/22 428/109
5,041,324 A * 8/1991 Siegling ................. D03D 11/02 428/167
5,080,142 A * 1/1992 Calamito ............... D03D 11/02 139/411
5,100,713 A * 3/1992 Homma ............... D03D 13/002 428/113
5,130,188 A * 7/1992 Anahara .............. D03D 25/005 442/205
5,219,636 A * 6/1993 Golz .................... D03D 15/587 139/411
5,236,020 A * 8/1993 Sakatani ................. B29C 70/24 139/384 R
5,238,728 A * 8/1993 Aucagne .............. D03D 25/005 428/109
5,263,516 A * 11/1993 van Schuylenburch ..................... D03D 25/005 442/205
5,399,418 A * 3/1995 Hartmanns .............. B64G 6/00 442/205
5,451,448 A * 9/1995 Sawko ..................... B64G 1/58 428/184
5,533,693 A * 7/1996 Abildskov ................ B64C 3/18 244/119
5,540,260 A * 7/1996 Mood .................. D03D 25/005 139/11
RE35,777 E * 4/1998 Givin .................... D21F 1/0045 139/414
5,843,542 A * 12/1998 Brushafer ............ D03D 15/593 428/36.1
6,128,998 A * 10/2000 Freitas ..................... D04C 3/00 87/8
6,418,973 B1 * 7/2002 Cox .......................... B32B 3/20 139/383 R
6,555,211 B2 * 4/2003 Moody ..................... B32B 5/26 428/920
6,890,612 B2 * 5/2005 Goering ............... D03D 25/005 493/51
6,911,247 B2 * 6/2005 Howland .............. F41H 5/0492 428/114
7,413,999 B2 * 8/2008 Goering ............... D03D 41/004 52/799.12
7,622,408 B2 * 11/2009 Zafiroglu ............ B32B 38/0012 442/388
7,655,581 B2 * 2/2010 Goering .................. B29C 70/24 442/205
7,713,893 B2 * 5/2010 Goering .................... B32B 5/06 442/205
7,964,520 B2 * 6/2011 Goering ............... D03D 15/267 442/205
8,163,362 B2 * 4/2012 Russell .................. D03D 15/43 428/36.1
8,859,083 B2 * 10/2014 Goering ................. D03D 11/02 428/179
9,850,598 B2 * 12/2017 Shahkarami ........... D03D 15/43
11,179,911 B2 * 11/2021 Piwonski ................ B32B 5/026
11,945,188 B2 * 4/2024 Wyrwis ................ H02G 3/0406
2002/0056484 A1 * 5/2002 Uchida .................. D03D 11/02 139/383 R
2002/0081416 A1 * 6/2002 Goering ............... D03D 25/005 428/129
2002/0090873 A1 * 7/2002 Moody ................ D03D 25/005 442/268
2002/0192450 A1 * 12/2002 Schmidt .................. B29C 70/24 428/192
2003/0078650 A1 * 4/2003 Nunez ....................... A61F 2/07 623/1.35
2005/0003141 A1 * 1/2005 Zafiroglu ............ B32B 38/0004 428/92
2006/0035553 A1 * 2/2006 Bader ..................... D03D 11/00 442/85
2006/0121809 A1 * 6/2006 Goering ............... D03D 25/005 442/205
2009/0068539 A1 * 3/2009 Kanazawa ........ H01M 8/04126 429/436
2010/0167616 A1 * 7/2010 Goering ................. D03D 11/02 442/205
2013/0105215 A1 * 5/2013 Morris ................. H05K 9/0098 174/394
2014/0251638 A1 * 9/2014 Pinarello ................. E21B 19/00 166/381
2015/0354105 A1 * 12/2015 Veyet ................... D03D 41/004 139/384 R
2018/0062364 A1 * 3/2018 Qiu .......................... D03D 3/02
2020/0354862 A1 * 11/2020 Shahkarami .............. B32B 5/26
2021/0137744 A1 * 5/2021 Rawson .............. A61F 13/0206

FOREIGN PATENT DOCUMENTS

DE 202012100837 U1 4/2012
EP 1542558 B2 12/2012
KR 102128105 B1 6/2020
KR 20200070675 A 6/2020
RU 2408747 C2 1/2011

* cited by examiner

TEXTILE FABRIC

CROSS-REFERENCE TO RELATED APPLICATIONS

This application claims the benefit of German Application Nos. 10 2023 202 211.7, filed Mar. 10, 2023 and 10 2023 108 966.8, filed Apr. 6, 2023, the entire disclosures of which are hereby incorporated herein by reference.

FIELD OF THE INVENTION

The invention relates to a textile fabric, in particular for automotive applications, and a corresponding method for producing the textile fabric.

BACKGROUND OF THE INVENTION

In the prior art, for automobiles—whether in the case of vehicles with combustion engines, electric motors or hybrid drive units—it is known and common practice to provide electrical cables or electrical energy storage units with a protective sheath.

The protective sheaths protect the cables/energy storage units from damage in case of accidents, in order to e.g. reduce the risk of fire. In order to obtain these functions, the protective sheaths are made of mechanically stable materials. This however yields an increase of the vehicles' weight and moreover, due to their lack of flexibility, such protective sheaths are difficult to install.

For this reason, the prior art aims for textile materials that have less weight and provide a greater flexibility for installation as a sheath. For example, textile materials made of aramid fibers, which are characterized by good impact resistance, came up as an option to be used in a protective sheath. However, a particular problem are the costs and by now also the availability, as aramid fibers are very much in demand for ballistics applications.

BRIEF SUMMARY OF THE INVENTION

In this regards, it is an object of the invention to obtain a textile fabric, in particular for automotive applications, which on the one hand has a low weight and on the other hand provides a good mechanical protective effect. At least it is an object of the invention to obtain one or more alternatives to the prior art.

This/these object(s) is/are solved by a textile fabric according to the claims herein.

The textile fabric is preferably a woven fabric comprising a textile fabric-body formed by a first thread group, of longitudinal threads, running in a longitudinal direction of the textile fabric-body, and a second thread group, of transverse threads, running in a transverse direction of the textile fabric-body, the first thread group and the second thread group being linked/combined with each other via the respective longitudinal and transverse threads such that force redirection structures running in the transverse direction are formed i. alternately on one side and another side of the textile fabric-body with a respective offset in the longitudinal direction, or ii. on one side of the textile fabric-body with a respective offset in the longitudinal direction, wherein each respective force redirection structure (40) is designed so as to cause, under force application, in particular in a normal direction of the fabric-body, at least a force redirection at least in the longitudinal direction of the textile fabric-body.

The textile fabric is, for example, a large-area broad-fabric that is e.g. suitable for protecting the outer wall of an electrical energy storage unit.

Alternatively, the textile fabric can be a strap in order to e.g. sheathe electrical cables in an automobile by putting the strap on the cable and rolling it up. Here, the longitudinal direction of the textile fabric and the longitudinal axis of the cable preferably coincide.

The outer edges of the textile fabric running in the longitudinal direction are joined e.g. with a selvedge or a knitted selvedge.

Preferably, the textile fabric may be woven such that it forms a tube. In particular, it is preferable that the longitudinal and transverse threads of the tube have elastic properties so that the tube can be expanded radially.

The offset between the force redirection structures is e.g. 3 mm to 8 mm.

The textile fabric is preferably formed as a woven fabric, with the longitudinal threads of the first thread group being warp threads and the transverse threads of the second thread group being weft threads.

Preferably, the textile fabric is formed such that the longitudinal and transverse threads of the first and second thread groups are linked/combined with each other to form at least a part of a respective force redirection structure such that a binding pattern is obtained, in which at least one first longitudinal thread runs above two lower transverse threads and below at least one upper transverse thread, which lies in the longitudinal direction between the two lower transverse threads.

The two lower transverse threads are preferably weft threads that are directly adjacent to the upper transverse thread or upper weft thread, respectively. This means that if the upper weft thread is the xth of n weft threads, the two lower weft threads are the (x−1)th and (x+1)th weft threads.

The first longitudinal thread is preferably one of the warp threads. A warp-rapport formed by the warp threads, in which a sequence of the binding pattern is repeated with respect to the warp threads, preferably comprises a single first longitudinal thread/warp thread or two first longitudinal threads/warp threads. The warp-rapport preferably contains four longitudinal threads/warp threads.

Preferably, the textile fabric is formed such that a respective force redirection structure is configured so that, under force application, the upper transverse thread is moved in a direction of the two lower transverse threads, whereby the first longitudinal thread is subjected to tension in the longitudinal direction.

When the upper transverse thread/weft thread moves in the direction of the two lower transverse threads/weft threads, the upper transverse thread/weft thread is pressed between the underlying transverse threads and the first longitudinal threads forming a support are pulled along, which causes the first longitudinal thread/warp thread or the first longitudinal threads/warp threads to be subjected to tensile stress.

Preferably, the textile fabric is formed such that the longitudinal and transverse threads of the first and second thread groups are linked/combined with each other to form at least part of the force redirection structure such that the binding pattern is obtained, in which at least one second longitudinal thread runs below the two lower transverse threads and above the at least one upper transverse thread, which lies in the longitudinal direction between the two lower transverse threads.

Preferably, the textile fabric is formed such that the longitudinal and transverse threads of the first and second thread groups are linked/combined with each other to form at least part of the force redirection structure such that the binding pattern is obtained, in which a third longitudinal thread runs below the two lower transverse threads and above two further lower transverse threads, between which the two lower transverse threads lie in the longitudinal direction.

The two further lower transverse threads are preferably weft threads that are directly adjacent to the two lower transverse threads/weft threads. I.e. if one of the other further transverse threads forms the x-th weft thread and the other the y-th weft thread, wherein x>y, then the two lower transverse threads/weft threads are the (x−1)-th weft thread and the (y+1)-th weft thread.

Preferably, the textile fabric is formed such that the transverse threads of the second thread group, viewed in the transverse direction of the textile fabric-body, are arranged in a zigzag or wave-like manner on a straight line in the longitudinal direction or in a plane defined by a thickness direction and the longitudinal direction of the textile fabric-body.

The arrangement of the transverse threads/weft threads on the straight line in the longitudinal direction is preferable obtained for the textile fabric or the fabric-body, respectively being rolled up or woven as a tube.

The zigzag arrangement of the transverse threads/weft threads is in particular provided for the textile fabric being the broad-fabric or the strap.

Preferably, for the longitudinal threads/warp threads and/or the transverse threads/weft threads of the textile fabric—preferably in the form of a strap, tube or broad-fabric—a polyester filament, for example a 1670dtex F192/Z60 polyester filament HT/NS, is used.

The longitudinal threads/warp threads and/or the transverse threads/weft threads of the textile fabric—preferably in the form of a strap, tube or broad-fabric—may be formed from high-strength polyester fibers as well as aramid fibers (continuous fibers or staple fibers), glass fibers, carbon fibers or high-performance fibers such as PPS fibers, PEEK fibers. In particular, the longitudinal threads/warp threads may be monofilaments as well as multifilaments, or a combination thereof.

The transverse threads/weft threads are preferably formed from a 0.30 mm polyester copolymer and a 0.25 mm polyester. Particularly preferred, the thickness of the transverse threads/weft threads is greater than that of the longitudinal threads/warp threads.

The longitudinal threads/warp threads may be a combination of the aforementioned materials, i.e. some of the longitudinal threads/warp threads may be formed from a different material than other of the longitudinal threads/warp threads.

The same applies preferably to the transverse threads/weft threads, in this respect e.g. a weft change can occur in the following manufacturing process If, for example, the textile fabric is intended to be used as a hose to insulate cables at the same time, textured 1340dtex polyester can be used.

However, other thread thicknesses, thread qualities or combinations are also conceivable, in order to use also other materials such as polyamide or recycled fibers for the longitudinal threads/warp threads and/or transverse threads/weft threads.

The method according to the invention for manufacturing a textile fabric, preferably a woven fabric, comprises the following steps:

linking/combining a first thread group, of longitudinal threads, running in a longitudinal direction of a textile fabric-body and a second thread group, of transverse threads, running in a transverse direction of the textile fabric-body, so that the textile fabric-body is formed, wherein the first group of threads and the second group of threads are linked/combined with each other via the respective longitudinal and transverse threads such that force redirection structures running in the transverse direction are formed i. alternately on one side and another side of the textile fabric-body with a respective offset in the longitudinal direction, or ii. on one side of the textile fabric-body with a respective offset in the longitudinal direction, wherein each respective force redirection structure is designed so as to cause, under force application, at least one force redirection at least in the longitudinal direction of the textile fabric-body.

The method is preferably performed on a needle strap weaving machine, with the longitudinal threads forming the warp threads and the transverse threads forming the weft threads. In particular, the needle strap weaving machine is used to weave the strap or the tube. The needle strap weaving machine preferably comprises a weft insertion needle that places a thread loop in the sheds formed during the weaving process. For this reason, the weft threads in the textile fabric, the strap or the tube, are double wefts due to the technology and are connected to each other between the weft insertions on the side facing the weft insertion needle.

On the side facing away from the weft insertion needle, there is a latch needle that interacts with the thread loop to create a stitch that forms the selvedge (knitted selvedge). An edge facing the weft insertion needle is preferably formed by the shed change and is therefore a selvedge.

In addition to the weft insertion needle mentioned above, the needle strap weaving machine can have a further weft insertion needle arranged on the same side of the warp threads or the formed sheds. The weft insertion needle and the further weft insertion needle can preferably work synchronously and preferably each insert a corresponding thread loop into the formed sheds, so that two weft threads, which are each double wefts due to the technology, are present in the corresponding shed. The latch needle can interact with both thread loops or a separate latch needle is provided for each weft insertion needle.

Alternatively, the weft insertion needle and the further weft insertion needle can be arranged on opposite sides of the strap/tube. This type of needle strap weaving machine is also known as an X-needle strap weaving machine.

In this case, both weft insertion needles can insert their respective thread loops into the same shed, so that there are again two double wefts per shed, or work alternately in sheds formed one behind the other, so that there is a double weft in each of the sheds due to the technology, which comes alternately from the weft insertion needle or the further weft insertion needle.

If the weft insertion needles are arranged on opposite sides of the strap/tube, there is also a latch needle on each side, which interacts with the corresponding thread loop guided through the shed to form the selvedge (knitting selvedge).

Providing several weft insertion needles is in particular preferable if different weft threads are used, which are made of different materials and/or have different thicknesses.

The invention and the method are not limited to the needle strap weaving machine or X-needle strap weaving machine. Other automatic weaving machines can also be used, for example a shuttle weaving machine, rapier weaving machine or nozzle weaving machine. These other automatic weaving machines can also have multiple weft thread entries per shed and the alternative automatic weaving machines can also have different selvedges.

The method according to the invention is preferably carried out such that the preferred embodiments of the textile fabric are obtained. In this respect, reference is made to the above explanations on the preferred embodiments of the textile fabric.

Furthermore, the method according to the invention can have a finishing step in which the textile fabric is given further desired properties.

For example, the finishing step may comprise a heat treatment step in which the produced textile fabric is heated/treated, preferably by applying heat. The heat treatment leads to the consolidation of the textile fabric. In addition, the final textile fabric shows little or no further shrinkage behavior during subsequent use and temperature influences.

Alternatively, or additionally, the finishing step can have a treatment step in which the textile fabric is treated with an agent; for example,

- the textile fabric can be dipped into the agent and then preferably squeezed out, and/or
- the agent is sprayed onto the textile fabric.

The agent used in the treatment step is used, for example, for flame retardancy and/or cut resistance and/or other purposes.

BRIEF DESCRIPTION OF THE DRAWINGS

In the following, preferred embodiments of the textile fabric according to the invention are described with reference to the attached figures.

As in FIG. 3*a*)

Analogous to FIGS. 3*a*) and 5.

DESCRIPTION OF EXAMPLE EMBODIMENTS

Figure 1:
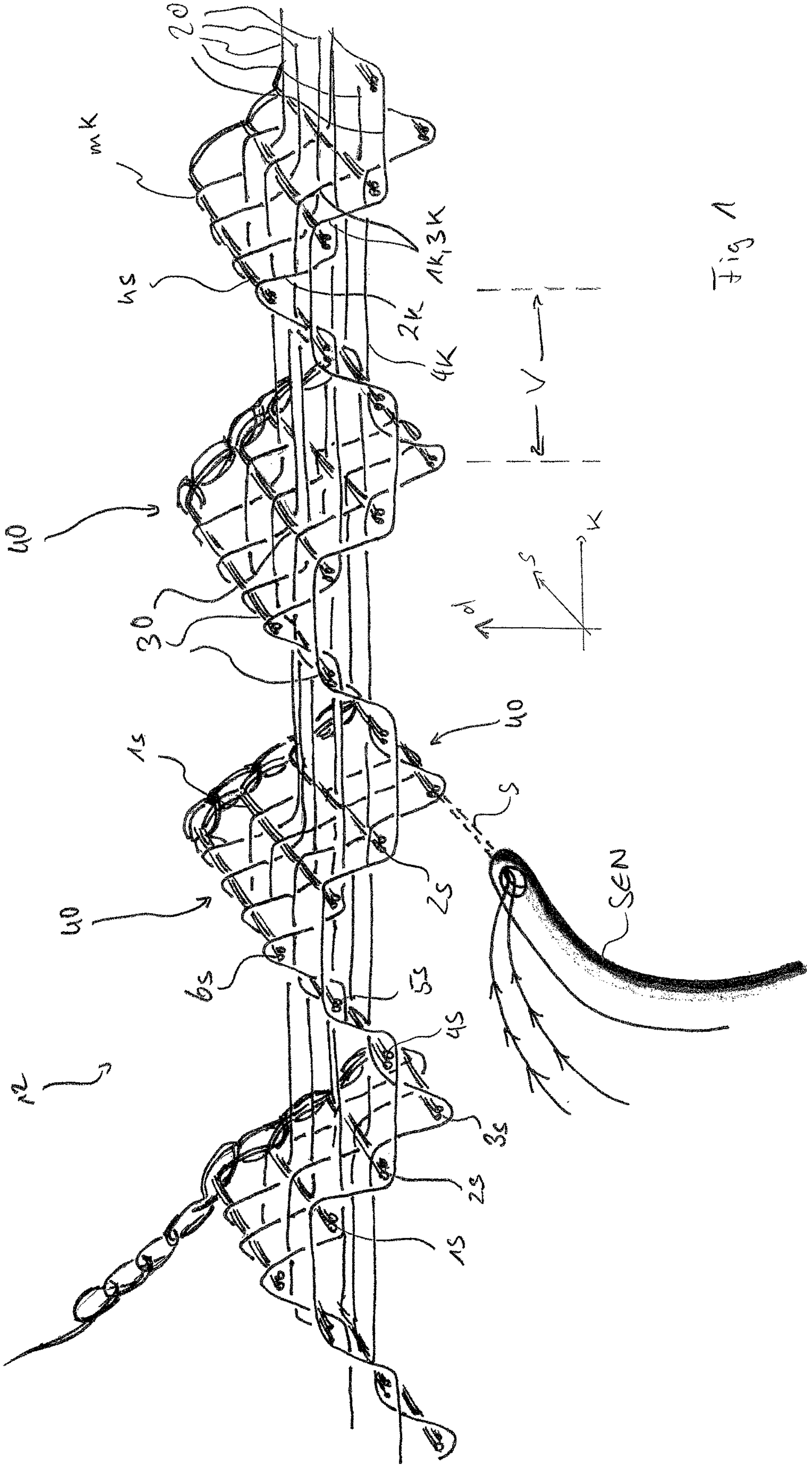
FIG. 1 is a perspective view of a first preferred embodiment of the textile fabric according to the invention, wherein the textile fabric is a woven strap from warp threads and weft threads and a plurality of warp-rapports a plurality of weft-rapports are visible in FIG. 1.

FIG. 1 shows a perspective view of a textile fabric 10 according to a first preferred embodiment of the invention.

The textile fabric 10 has a first thread group 20 with a plurality of longitudinal threads 1*k*, . . . , mk, which run in the longitudinal direction of the textile fabric 10. The longitudinal direction of the textile fabric 10 corresponds to a direction along the k-axis of the coordinate system shown in FIG. 1.

In addition, the textile fabric 10 has a second thread group 30 with a plurality of transverse threads 1*s*, . . . , ns running in the transverse direction. The transverse direction of the textile fabric 10 corresponds to a direction along the s-axis of the coordinate system shown in FIG. 1.

In total, the thread groups 20, 30 form a textile fabric-body 12 which is stretched in the aforementioned longitudinal direction (k-direction) and transverse direction (s-direction).

The d-axis of the coordinate system shown in FIG. 1 corresponds to a thickness direction of the textile fabric 10 or the fabric-body 12.

The textile fabric 10 or the textile fabric-body 12 is preferably a woven fabric. Accordingly, the longitudinal threads 1*k*, . . . , mk form warp threads of the fabric, and the transverse threads 1*s*, . . . , ns correspond to a weft thread s of the woven fabric-body 12, which is laid into the fabric at the correspondingly designated positions such that the transverse threads/weft threads 1*s*, . . . , ns are formed.

Particularly preferably, the textile fabric 10 according to the invention is a woven strap that extends in the aforementioned longitudinal direction.

The strap is preferably produced on a needle strap weaving machine.

FIG. 1 schematically shows a weft insertion needle SEN of the needle strap weaving machine. During operation of the needle strap weaving machine or production of the strap, the weft insertion needle SEN places the weft thread s as a thread loop in a shed formed by lifting certain warp threads 1*k*, . . . , mk. The weft insertion needle SEN is arranged at the side of the strap and is offset so as to pass from there through the shed.

After the weft insertion needle SEN has completely passed through the formed shed and is reaching the corresponding opposite end of the shed with the weft thread s as a thread loop, a stitch is formed there by a latch needle not shown in FIG. 1. The stitch formation serves to form a corresponding strap edge, which is located on the side facing away from the weft insertion needle SEN.

For example, the latch needle can form the strap edge by i. forming a stitch from the weft thread loop,
ii. tying off the thread loop formed from the weft thread s via a catch thread that forms the stitch,
iii. forming a stitch from the weft thread s, which is passed through as a thread loop, and at least one catch thread fed in, or
iv. forming a stitch from the weft thread s, which is passed through as a thread loop, at least one catch thread fed in and a blocking thread fed in.

Variant iii. is preferred, whereby a single catch thread is used.

The strap edge formed by the latch needle is therefore a knitted selvedge due to the technology.

At the end of the formed shed facing the weft insertion needle SEN, the strap edge is formed there by the shed change that takes place after the weft insertion needle SEN has returned. The strap edge facing the weft insertion needle SEN is therefore a selvedge.

It is clear from the above explanation that each of the weft threads 1*s*, . . . , ns shown in FIG. 1 represents a double weft due to the thread loop and the weft threads 1*s*, . . . , ns are connected to each other on the side facing the weft insertion needle SEN, thereby forming the selvedge.

The textile fabric 10 according to the invention is not limited to the configuration as a strap and also not to the edges, selvedge and/or knitted selvedge, as explained.

For example, the textile fabric 10 can be a large-area broad-fabric that is not produced with the needle strap weaving machine, but with a different type of automatic weaving machine, in which, for example, the direction of an insertion of the weft thread changes and other types of edges also result.

The strap (or the tube, which will be explained below) can also be produced using a different type of weaving machine.

The longitudinal threads or warp threads 1*k*, . . . , mk of the textile fabric 10 according to the invention are linked or combined or interwoven with the corresponding transverse threads or weft threads 1*s*, . . . , ns in such a way that force redirection structures 40 are formed running in the transverse direction or in the direction of the s-axis of the coordinate system. The force redirection structures 40 run completely across the entire textile fabric 10 in the aforementioned transverse direction.

The force redirection structures 40 are repeated in the longitudinal direction shown in FIG. 1, preferably at regular intervals according to the offset V shown. The force redirection structures 40 are preferably formed alternately on one side, the upper side, and another side, the underside, of the textile fabric 10.

Alternatively, the force redirection structures 40 can be formed with a preferably regular offset V on one of the sides, the top side or the bottom side.

The offset shown or the corresponding distance is, for example, 3 mm to 8 mm, particularly preferably 5 mm.

The force redirection structures 40 have the effect and nature that when force is applied to the fabric-body 12 from normal direction, which corresponds to the d-axis shown in FIG. 1, force is redirected at least in the longitudinal direction of the textile fabric-body 12.

The textile fabric 10 offers good protection for a sheathed object, such as a cable or a drive accumulator in a motor vehicle, thanks to the force deflection.

Figure 2:
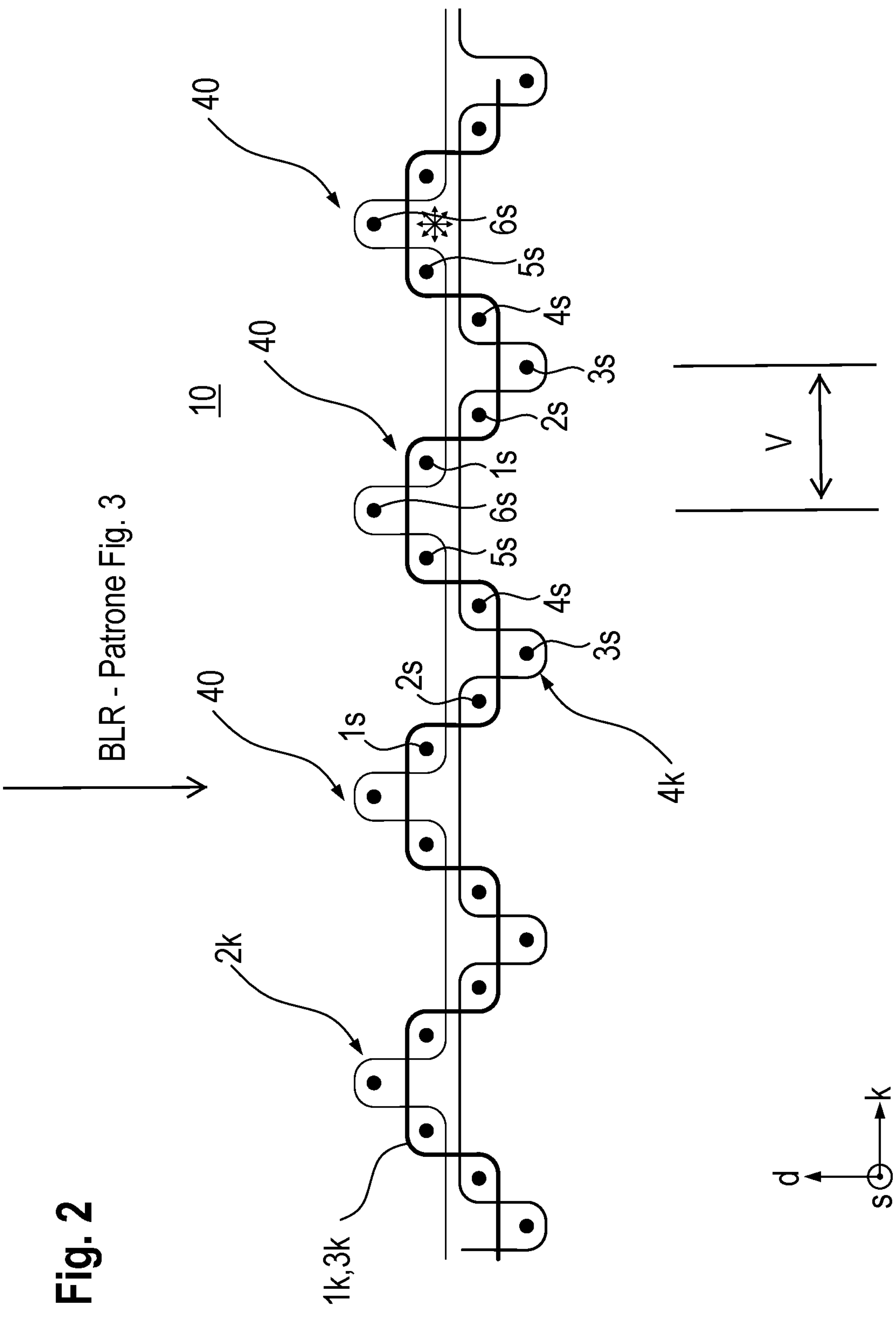
FIG. 2 shows a fabric section of the strap shown in FIG. 1, wherein the warp threads of a warp-rapport and the plurality of weft-rapport are visible.

With reference to FIGS. 2 and 3, the binding pattern of the textile fabric leading to the force redirection structures 40 is explained.

Figure 3A:
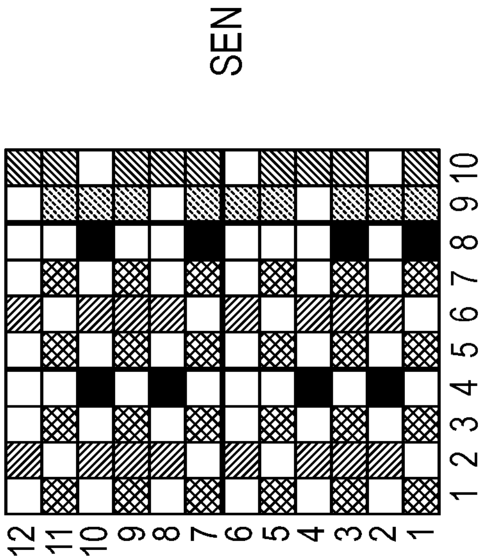
FIG. 3*a*) shows a positive bonding cartridge of the strap from FIGS. 1 and 2, wherein the positive bonding cartridge corresponds to a top view in FIG. 1 of the strap from above in the negative thickness direction (d direction).

FIG. 2 shows a section of the textile fabric 10 from FIG. 1 and FIG. 3*a* shows a corresponding positive binding cartridge. The viewing direction, which corresponds to the positive binding cartridge in FIG. 3*a*), is shown in FIG. 2 by an arrow BLR.

The four longitudinal threads or warp threads 1*k*, . . . , 4*k* shown in FIG. 2 together form a warp-rapport, which corresponds to columns 1 to 4 in FIG. 3*a*). FIG. 3*a*) also shows a second warp-rapport in columns 5 to 8, from which the repetition of the binding pattern in relation to the warp threads 1*k*, . . . , 4*k* can be seen.

The warp threads shown in columns 9 and 10 in FIG. 3*a*) serve the edge formation; in the case of the aforementioned strap to form the explained selvedge. In this respect, columns 9 and 10 are on the side facing the weft insertion needle SEN and the warp thread according to column 1 is on the side facing away from the weft insertion needle SEN. Columns 9 and 10 or the bindings of the corresponding warp threads can be varied or omitted.

In addition to the warp threads, the weft threads explained with reference to FIG. 1 are shown in FIG. 2. To simplify the representation, they are not shown as double wefts.

FIG. 2 includes a large number of complete weft-rapports from the weft threads 1*s*, . . . , 6*s*. Each row shown in FIG. 3*a*) corresponds to one of the weft threads 1*s* to 6*s*, resulting in two repeating weft-rapports from the total of twelve rows. Rows 1 to 6 and rows 7 to 12 each correspond to a weft-rapport of the weft threads 1*s*, . . . , 6*s*.

FIG. 3*a*) shows a total of four warp and four weft-rapports. Each box of the binding cartridge corresponds to a binding point at which the warp thread of the column intersects with a weft thread of the respective row. If a box is filled, the warp thread runs above the corresponding weft thread, whereas if it is empty, the warp thread runs below the corresponding weft thread.

Preferably, the warp thread 1*k* or the warp thread 3*k* forms a first longitudinal thread or warp thread, which runs in the positive d-direction above the transverse threads or weft threads 5*s* and 1*s* according to the fabric section from FIG. 2 and the binding cartridge according to FIG. 3*a*). Preferably, both warp threads 1*k* and 3*k* run equally above the weft threads 5*s* and 1*s* and each form the first longitudinal thread or warp thread. Here, the weft threads 5*s* and 1*s* form two lower transverse threads.

The weft thread 6*s* (line 6) located in the longitudinal direction (k-axis) between these weft threads 5*s* and 1*s* lies on the first warp thread 1*k*, 3*k*. If both warp threads 1*k*, 3*k* run above the two lower weft threads 5*s* and 1*s*, the weft thread 6*s* therefore lies on both warp threads 1*k*, 3*k*.

As can be seen in FIG. 2, the weft thread 6*s* forms an upper weft thread/transverse thread 6*s*.

At the same time, the upper weft thread 6*s* corresponds to a tip of the corresponding force redirection structure 40. Only the warp thread 2*k* runs over the upper weft thread 6*s* according to the fabric section in FIG. 2 and the binding cartridge in FIG. 3*a*).

The warp thread 2*k* is preferably the only warp thread in the warp-rapport shown that has this pathway above the upper weft thread 6*s*. In relation to the adjacent weft threads 5*s*, 1*s*, the pathway of the warp thread 2*k* is selected in such a way that-unlike the adjacent warp threads 1*k*, 3*k*—it runs below these weft threads 5*s*, 1*s*. In this regard, cf. FIG. 2 in conjunction with FIG. 3*a*) the binding points according to column 2, lines 5 and 7. The warp thread 2*k* then floats to the adjacent force redirection structure 40 on the same side of the fabric-body 12, where its pathway is repeated.

Adjacent to the weft threads 5*s*, 1*s* are the weft threads 4*s* (line 4) and 2*s* (line 8), which form two further lower weft threads 4*s*, 2*s*. The weft threads 5*s*, 6*s*, 1*s* (rows 5 to 7) are located longitudinally between the two further lower weft threads 4*s*, 2*s*.

The warp threads 1*k*, 3*k* run underneath these further lower weft threads 4*s*, 2*s* according to the fabric section in FIG. 2 and the binding cartridge in FIG. 3*a*).

The remaining warp thread 4*k* belonging to the same warp-rapport runs over the two further lower weft threads 4*s*, 2*s* according to FIG. 2 in conjunction with FIG. 3*a*) and floats between these weft threads 4*s*, 2*s* below the weft threads 5*s*, 6*s*, 1*s*.

The star drawn in FIG. 2 in the rightmost force redirection structure 40 indicates that the binding pattern leads to the distances shown qualitatively, i.e. that the upper weft thread/transverse-thread 6*s*, the two lower weft threads/transverse-threads 5*s*, 1*s*, and the two further lower weft threads/transverse-threads 4*s*, 2*s* lie in different planes in each case.

The textile fabric 10 shown in FIG. 1 and FIG. 2 is not subjected to either tension or compression. In other words, FIGS. 1 and 2 show an unloaded state of the textile fabric 10 or strap.

FIGS. 1 and 2 show that, due to the binding, the fabric-body 12 aligns itself in such a way that the points shown in FIG. 2, which indicate the weft threads 1*s* to 6*s*, have a zigzag shape in the d-k plane.

If an external force acts on the textile fabric 10 along the shown thickness direction (d-axis), the force redirection structures 40 develop the protective effect already mentioned by redirecting the external force in the longitudinal direction (k-axis).

The external force is redirected in the longitudinal direction by the fact that, under force application, of the force redirection structures 40 by the external force, the upper weft thread 6*s* is moved in the direction of the two lower weft threads 5*s*, 1*s*, as a result of which the warp threads 1*k*, 3*k* (first longitudinal thread or first longitudinal threads) are subjected to tensile stress in the longitudinal direction. The lower weft threads 5*s*, 1*s* act as bearings for the warp threads 1*k*, 3*k*.

The further, lower weft threads 4*s*, 2*s* act as bearings for the warp thread 4*k*, which floats below the weft threads 5*s*, 6*s*, 1*s* and in turn forms a support for them. If the weft threads 5*s*, 6*s*, 1*s* are pressed between the further, lower weft threads 4*s*, 2*s* and on the warp threads 4*k*, the external force is again redirected in the longitudinal direction of the textile fabric-body 12.

In FIGS. 1 and 2, the fabric-body 12 is essentially flat in such a way that it extends in the s-k plane. As already mentioned, the fabric-body 12 is not limited to the shown strap, but can be formed over a large-area. For example, such a large-area fabric-body 12 can protect an outer surface of an electric accumulator, which serves as an energy source for an electric drive unit of an automobile, from external loads.

The shown strap can be used to protect smaller objects in a flat design or, for example, to sheathe electrical cables, especially high-voltage cables. In order to realize such a sheath of electrical cables, it is preferable that the weft threads 1*s* to 6*s* have material-specific properties such that they warp under thermal stress or heating in such a way that the fabric-body 12 curls around the k-axis to form the sheath.

Alternatively, the weft threads 1*s* to 6*s* can have material-specific properties such that they become more flexible/softer when heated, allowing the fabric-body 12 to be rolled up to sheathe the electrical cable. If the weft threads 1*s* to 6*s* cool down again after the electrical cable has been sheathed, the rolled-up fabric-body 12 retains its shape.

Furthermore, the weft threads 1*s* to 6*s* can have such material-specific properties that they can be bent without heating to sheathe the electrical cable and then remain dimensionally stable.

After the textile fabric-body 12 has been rolled up, the weft threads 1*s* to 12*s* lie essentially on a horizontal straight line in the d-k plane. This arrangement also applies to the tube explained below with reference to FIG. 4.

Figure 3B:
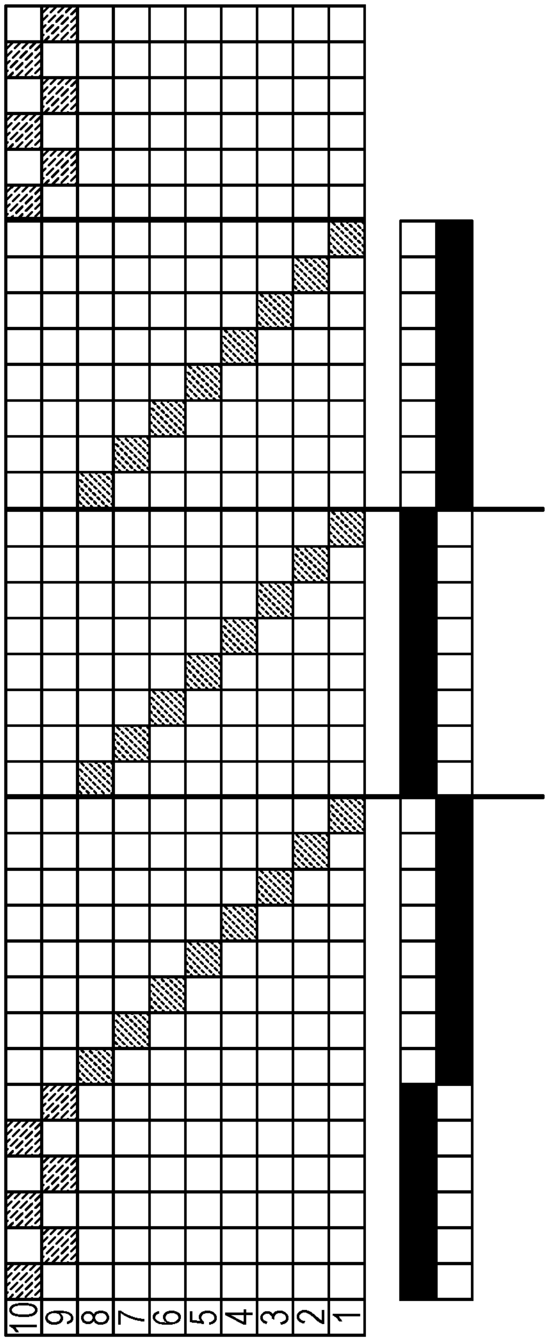
FIG. 3*b*) shows a shaft feed and a reed feed for the binding cartridges according to FIGS. 3*a*) and 3*b*).

FIG. 3*b*) shows an exemplary shaft feed and an exemplary reed feed, which are preferably selected when using the needle strap weaving machine described. The invention is not limited to the shaft and reed feed shown.

According to FIG. 3*b*), eight shafts (rows 1 to 8 in FIG. 3*b*) are provided to which the warp threads are attached according to columns 1 to 8 in FIG. 3*a*). Each of the eight warp threads according to columns 1 to 8 in FIG. 3*a*) is assigned to one of the shafts and attached to it, respectively. In addition, two shafts according to rows 9 and 10 in FIG. 3*b*) are provided to form the selvedge, which are connected to the warp threads according to columns 9 and 10 in FIG. 3*a*). In FIG. 3*b*), the shaft feed of the needle strap weaving machine is shown repeatedly for six warp-rapports. This representation serves to explain the reed feed.

The reed is very coarse and selected so that the warp threads of two warp-rapports, i.e. the warp threads according to columns 1 to 8 in FIG. 3*a*), run through an opening between two adjacent reed rods. For illustration of the reed feed, the shaft feeds are illustrated above in a repeating manner.

The textile fabric 10 described in FIGS. 1 to 3 can also be used to form a closed tube. For example, two textile fabrics 10 are woven in a manner so as to form the closed tube together. This is explained with reference to FIGS. 4 and 5.

Figure 4:
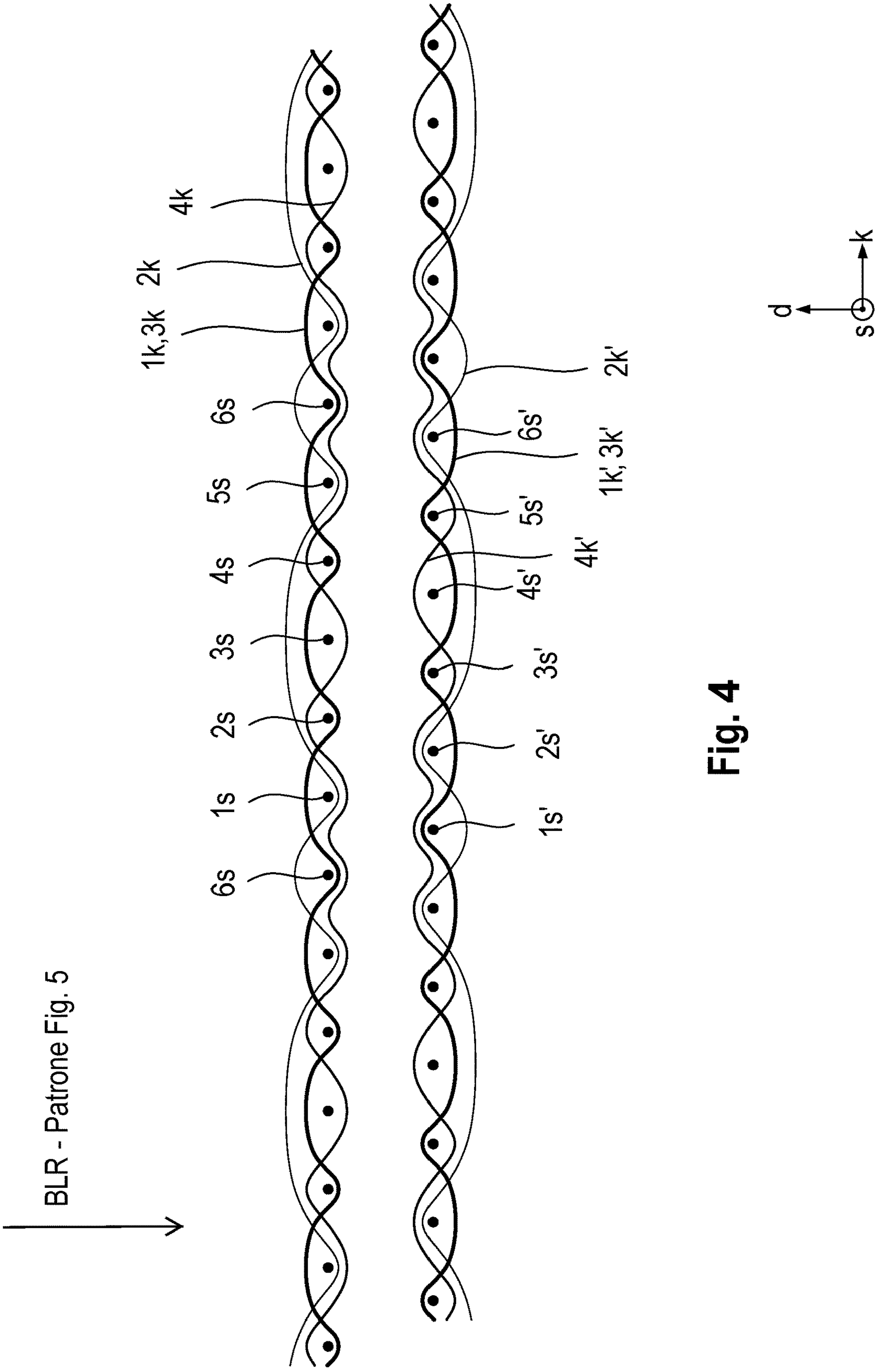
FIG. 4 shows a fabric section of a textile tube formed from two fabric layers of the textile fabric according to the first preferred embodiment shown in FIGS. 1 to 3.

FIG. 4 shows an upper textile fabric 10 and a lower textile fabric 10', both of which are identical to the textile fabric 10 in FIGS. 1 to 3.

FIG. 4 shows both textile fabrics 10 and 10' in the fabric section, wherein the coordinate system is arranged identically as in FIG. 2. A weft-rapport 1*s* to 6*s* or 1*s'* to 6*s'* is shown in relation to the upper and lower textile fabric 10, 10'. Similarly, the corresponding warp threads 1*k*, 2*k*, 3*k*, and 4*k* and 1*k'*, 2*k'*, 3*k'*, and 4*k'* are labeled accordingly.

The binding pattern of the upper and lower textile fabric 10, 10' is identical to that in FIG. 2, wherein reference is made to the corresponding explanations.

FIG. 5*a* shows a positive binding cartridge of the textile tube from FIG. 4. The viewing direction BLR, which corresponds to the positive binding cartridge, is shown in FIG. 4 with an arrow BLR.

Figure 5:
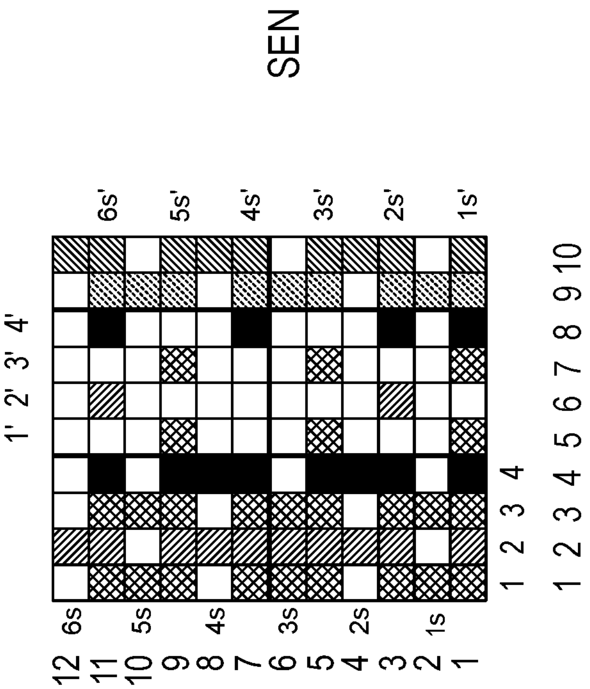
FIG. 5 shows a positive (FIG. 5*a*) binding cartridge of the tube from FIG. 4.

In contrast to FIG. 3*a*), the binding cartridge according to FIG. 5 does not show two warp-rapports in columns 1 to 8, but a warp-rapport of the upper textile fabric 10 and a warp-rapport of the lower textile fabric 10'. Columns 1 to 4 identify the four warp threads 1*k*, . . . , 4*k* of the upper textile fabric 10 and columns 5 to 8 identify the warp threads 1*k'*, . . . , 4*k'* of the lower textile fabric 10'.

Lines 1 to 12 indicate the weft threads, whereby the lines with even numbers indicate the weft threads of a weft-rapport 1*s*, . . . , 6*s* in the upper textile fabric 10 and the lines with odd numbers indicate the weft threads 1*s'*, . . . , 6*s'* of a weft-rapport in the lower textile fabric 10'.

In addition, the binding cartridge according to FIG. 5 indicates the location of the weft thread by, when the weft thread is located in the lower textile fabric 10', all binding points of the upper textile fabric 10 being completely filled, and when the weft thread is located in the upper textile fabric 10, all binding points of the lower textile fabric 10' being illustrated colorless. This system, in which the binding points are illustrated fully filled or colorless when the weft thread is located in the respective other textile fabric, is derived from the viewing direction BLR (FIG. 4), which corresponds to the binding cartridge in FIG. 5.

From the above explanations, it results that the positive binding cartridge from FIG. 5 shows a weft-rapport in the upper textile fabric 10 and a weft-rapport in the lower textile fabric 10', whereby the respective binding pattern is identical to a weft-rapport from FIG. 3*a*). Consequently, reference is made to the explanations for FIG. 3*a*).

The warp threads according to columns 9 and 10 in FIG. 5 are again used to form the selvedge facing the weft insertion needle SEN. The knitting selvedge is formed on the other side facing away from the weft insertion needle SEN.

The upper textile fabric 10 and the lower textile fabric 10' are joined together at the selvedge and the knitted selvedge to form the closed tube. In other words, the selvedge and the knitted selvedge are produced in a manner that the textile fabrics 10, 10' are joined.

The shaft feed and the reed feed for forming the tube are identical to those in FIG. 3*b*), so that reference is made to the corresponding explanations.

A second preferred embodiment of the textile fabric is now described with reference to FIGS. 6 and 7.

Figure 6:
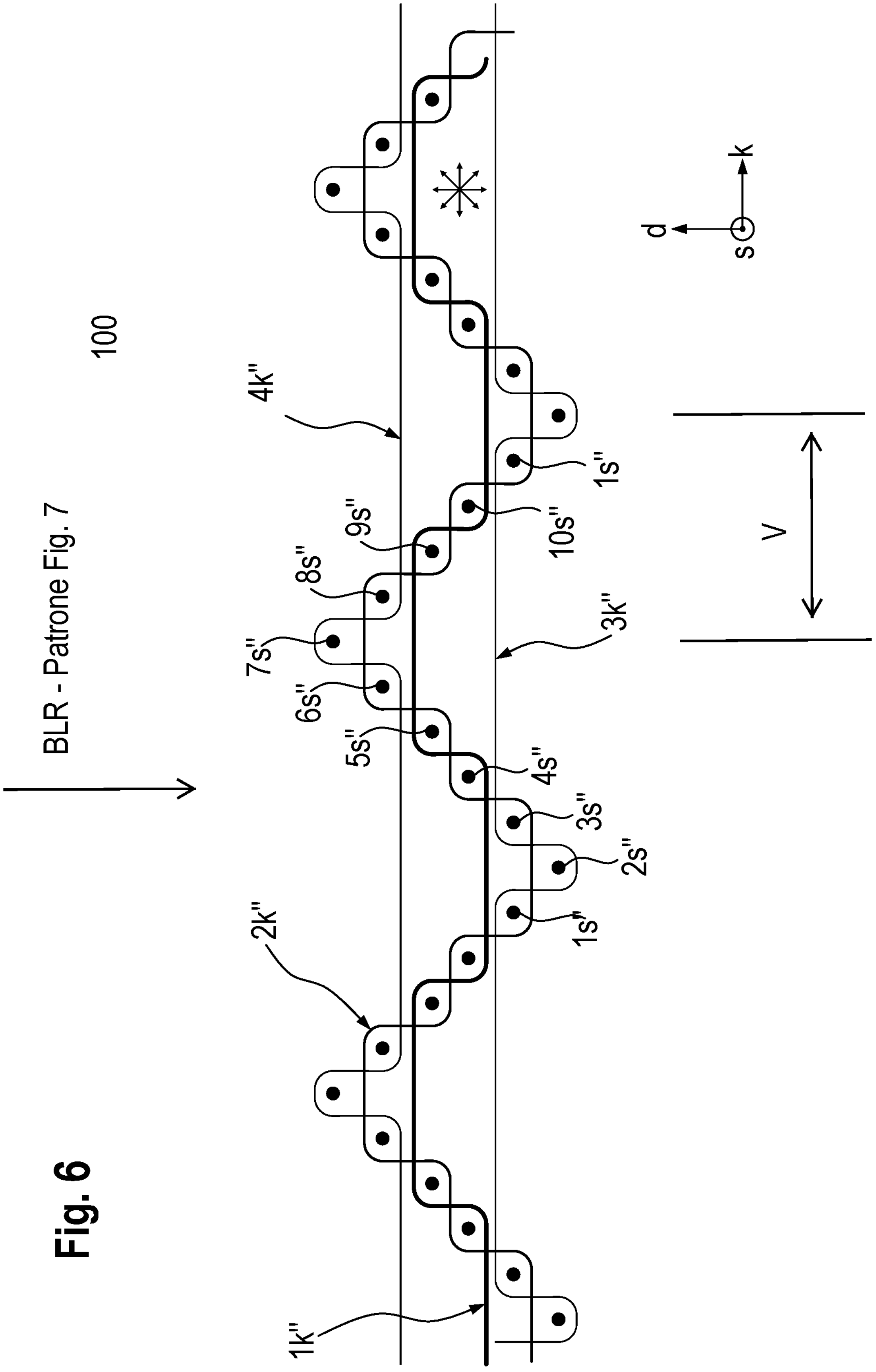
FIG. 6 shows a fabric section of a textile fabric according to a second preferred embodiment of the invention, wherein warp threads of a warp-rapport are labeled and a plurality of weft-rapports are visible.

FIG. 6 shows a fabric section of the textile fabric 100 according to the second preferred embodiment, wherein the fabric section corresponds to the d-k plane.

Figure 7:
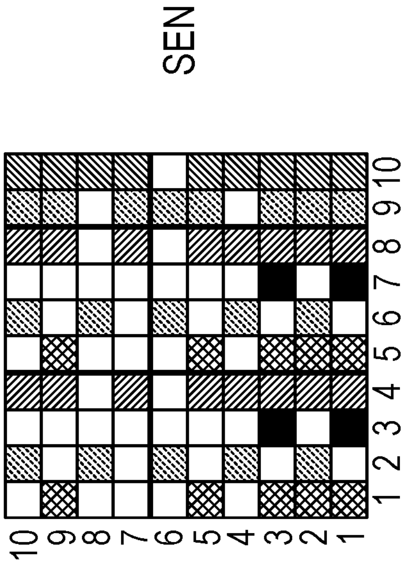
FIG. 7 shows a positive binding cartridge of the textile fabric according to the second preferred embodiment of FIG. 6.

FIG. 7 shows a corresponding positive binding cartridge, with the associated viewing direction BLR shown in FIG. 6.

The textile fabric has a first thread group consisting of longitudinal threads/warp threads and a second thread group consisting of transverse threads/weft threads. The thread groups form a corresponding fabric-body.

The longitudinal threads or warp threads 1*k*, . . . , m*k* of the textile fabric 100 according to the invention are linked or combined or interwoven with the corresponding transverse threads or weft threads 1*s*, . . . , n*s* in such a way that force redirection structures 140 are formed running in the transverse direction or in the direction of the s-axis of the coordinate system. The force redirection structures 140 run completely across the entire textile fabric 100 in the aforementioned transverse direction.

The force redirection structures 140 are repeated in the longitudinal direction shown in FIG. 6, preferably at regular intervals according to the offset V shown. The force redirection structures 140 are preferably formed alternately on one side, the upper side, and another side, the lower side, of the textile fabric 100.

Alternatively, the force redirection structures 140 can be formed with a preferably regular offset V on one of the sides, the top side or the bottom side.

The offset shown or the corresponding distance is, for example, 5 mm to 10 mm, particularly preferably 7 mm.

As in the first preferred embodiment, the force redirection structures 140 have the effect and nature that when force is applied to the textile fabric or the fabric-body, respectively from the direction of a normal, which corresponds to the d-axis shown in FIG. 6, a force is redirected at least in the longitudinal direction (k-direction).

The binding pattern of the textile fabric 100, leading to the force redirection structures 140 is described with reference to FIGS. 6 and 7.

Together the four longitudinal threads or warp threads 1*k*", . . . , 4*k*" shown in FIG. 6 form a warp-rapport, which corresponds to columns 1 to 4 in FIG. 7. FIG. 7 shows moreover a second warp-rapport in columns 5 to 8, from which the repetition of the weave pattern in relation to the warp threads 1*k*", . . . , 4*k*" can be seen.

The warp threads shown in columns 9 and 10 in FIG. 7 are used for edge formation (selvedge or knitted selvedge). Columns 9 and 10 are on the side facing the weft insertion needle SEN and the warp thread according to column 1 is on the side facing away from the weft insertion needle SEN. Columns 9 and 10 or the bindings of the corresponding warp threads can be varied or omitted.

As in the first embodiment, the textile fabric 100 can be a large-area structure (broad woven fabric) or a strap. It can also be double-woven to form a closed tube, as explained above.

FIGS. 6 and 7 contain a complete weft-rapport of weft threads 1*s*", . . . , 10*s*". Each line shown in FIG. 7 corresponds to one of the weft threads 1*s*" to 10*s*" of the weft-rapport. The binding cartridge according to FIG. 7 therefore contains a complete weft-rapport.

Preferably, the warp thread 2*k*" (column 2) forms a first longitudinal thread or warp thread, which runs in the positive d-direction above the transverse threads or weft threads 6*s*" (row 6) and 8*s*" (row 8) according to the fabric section from FIG. 6 and the binding cartridge according to FIG. 5. The weft threads 6*s*" (line 6) and 8*s*" (line 8) form two lower transverse threads in this context.

The weft thread 7*s*" (line 7) located in the longitudinal direction (k-axis) between these weft threads 6*s*" (line 6) and 8*s*" (line 8) lies on the first warp thread 2*k*.

As can be seen in FIG. 6, the weft thread 7*s*" forms an upper weft thread/transverse thread 7*s*".

At the same time, the upper weft thread 7*s*" corresponds to a tip of the corresponding force redirection structure 140. Only the warp thread 4*k*" (column 4) runs over the upper weft thread 7*s*" according to the fabric section in FIG. 6 and the binding cartridge in FIG. 7.

The warp thread 4*k*" (column 4) is preferably the only warp thread in the warp-rapport shown that has this pathway above the upper weft thread 7*s*". In relation to the adjacent weft threads 6*s*", 8*s*", the pathway of the warp thread 4*k*" is selected in a manner that—unlike the warp thread 2*k*"—it runs below these weft threads 6*s*", 8*s*". The warp thread 4*k*" then floats to the adjacent force redirection structure 40 on the same side of the fabric-body, where its pathway is repeated.

Adjacent to the lower weft threads 6*s*", 8*s*" are the weft threads 5*s*" (row 5) and 9*s*" (row 9), which form two further lower weft threads. The weft threads 6*s*", 7*s*", 8*s*" (rows 6 to 8) are located between the two further weft threads 5*s*", 9*s*" in the longitudinal direction.

The warp thread 2*k*" runs underneath these further lower weft threads 5*s*", 9*s*" according to the fabric section in FIG. 6 and the binding cartridge in FIG. 7. The warp thread 1*k*", on the other hand, runs over these further lower weft threads 5*s*", 9*s*" and floats below the weft threads 6*s*", 7*s*", 8*s*".

The textile fabric 100 also has four further lower weft threads 3*s*", 4*s*", 10*s*", 1*s*“. The weft threads 4*s*”, 5*s*", 6*s*", 7*s*", 8*s*", 9*s*", 10*s*" are located longitudinally between the further lower weft threads 3*s*", 1*s*" and the weft threads 5*s*", 6*s*", 7*s*", 8*s*", 9*s* are located between the further lower weft threads 4*s*", 10*s*".

The warp thread 2*k*" runs over the further lower weft threads 4*s*", 10*s*" and below the further lower weft threads 3*s*", 1*s*".

The warp thread 1*k*" runs over the two further lower weft threads 5*s*", 9*s*" according to FIG. 6 in conjunction with FIG. 7 and floats between these weft threads below the weft threads 6*s*", 7*s*", 8*s*". In addition, the warp thread 1*k*" runs underneath the further lower weft threads 4*s*", 10*s*" and then floats up to the adjacent force redirection structure 140.

The remaining warp thread 3*k*, which belongs to the same warp-rapport, runs over the further lower weft threads 3*s*", 1*s*" according to FIG. 6 in conjunction with FIG. 7 and floats between these weft threads below the weft threads 4*s*", . . . , 10*s*".

The star drawn in FIG. 6 in the rightmost force redirection structure 140 has the same meaning as in the first embodiment.

The textile fabric 10 shown in FIG. 6 is not subjected to tension or compression, which shows that the fabric-body is aligned due to the binding in a manner that the points shown in FIG. 6, which indicate the weft threads, have a preferably zigzag shape in the d-k plane.

If an external force acts on the textile fabric 100 along the shown thickness direction (d-axis), the force redirection structures 140 develop their protective effect by redirecting the external force in the longitudinal direction (k-axis).

When force is applied to the force redirection structures 140, the upper weft thread 7*s*" is moved in the direction of the two lower weft threads 6*s*", 8*s*", as a result of which all three weft threads 6*s*", 7*s*", 8*s*" move together further in the direction of the floating warp thread 1*k*. The floating warp thread 1*k* forms a support for the three weft threads 6*s*", 7*s*", 8*s*".

The further, lower weft threads 5*s*", 9*s*" act as bearings. If the weft threads 6*s*", 7*s*", 8*s*" are pressed between the further, lower weft threads 5*s*", 9*s*" and onto the warp thread 1*k*, the external force is redirected in the longitudinal direction of the textile fabric-body 12.

The warp thread 3*k* floating below the weft threads 4*s*" to 10*s*" forms a further support for these weft threads.

As in the first embodiment, the textile fabric 100 can be used as flat protection or rolled up to e.g. sheathe a cable. Reference is made to the corresponding explanations regarding the first embodiment.

The explanations prior to the description of the figures apply to the preferred embodiments, as well.

The invention claimed is:

1. A textile woven fabric (10) comprising a textile fabric-body (12) formed by:

a first thread group (20) of longitudinal warp threads running in a longitudinal direction of the textile fabric-body (12), the first thread group (20) including at least:
- a first longitudinal thread (1*k*, 3*k*),
- a second longitudinal thread (2*k*), and
- a third longitudinal thread (4*k*), and a second thread group (30) of transverse weft threads running in a transverse direction of the textile fabric-body (12), the second thread group (30) including at least:
- an upper transverse thread (6*s*),
- two lower transverse threads (1*s*, 5*s*), wherein the upper transverse thread (6*s*) lies in the longitudinal direction between the two lower transverse threads (1*s*, 5*s*), and
- two further lower transverse threads (2*s*, 4*s*), between which the two lower transverse threads (5*s*, 1*s*) lie in the longitudinal direction, wherein the first thread group (20) and the second thread group (30) are linked/combined with each other via the respective longitudinal warp threads and transverse weft threads such that force redirection structures (40) running in the transverse direction are formed:

i. alternately on one side and another side of the textile fabric-body (12) with a respective offset in the longitudinal direction, or ii. on one side of the textile fabric-body (12) with a respective offset in the longitudinal direction, wherein the longitudinal warp threads and transverse weft threads of the first and second thread groups (20, 30) are linked/combined with each other to form at least a part of a respective force redirection structure (40) such that a binding pattern is obtained in which:
- the first longitudinal thread (1*k*, 3*k*) runs below the upper transverse thread (6*s*), above the two lower transverse threads (1*s*, 5*s*), and below the two further lower transverse threads (2*s*, 4*s*),
- the second longitudinal thread (2*k*) runs below the two lower transverse threads (1*s*, 5*s*) and above the upper transverse thread (6*s*), and
- the third longitudinal thread (4*k*) runs below the two lower transverse threads (1*s*, 5*s*) and above the two further lower transverse threads (2*s*, 4*s*), and wherein each respective force redirection structure (40) is designed so as to cause, under force application, in a normal direction of the textile fabric-body (12), at least a force redirection at least in the longitudinal direction of the textile fabric-body (12).

2. The textile woven fabric (10) according to claim 1, wherein a respective force redirection structure (40) is configured so that, under force application, the upper transverse thread (6*s*) is moved in a direction of the two lower transverse threads (1*s*, 5*s*), whereby the first longitudinal thread (1*k*, 3*k*) is subjected to tension in the longitudinal direction.

3. The textile woven fabric (10) according to claim 1, wherein the transverse weft threads of the second thread group (30), viewed in the transverse direction of the textile fabric-body (12), are arranged in a zigzag or wave-like manner on a straight line in the longitudinal direction or in a plane defined by a thickness direction and the longitudinal direction of the textile fabric-body (12).

4. A method of manufacturing a textile woven fabric (10) comprising the following steps:

providing a first thread group (20) of longitudinal warp threads including at least:
- a first longitudinal thread (1*k*, 3*k*),
- a second longitudinal thread (2*k*), and
- a third longitudinal thread (4*k*), providing a second thread group (30) of transverse weft threads including at least:
- an upper transverse thread (6*s*),
- two lower transverse threads (1*s*, 5*s*), and
- two further lower transverse threads (2*s*, 4*s*), linking/combining of the first thread group (20) and second thread group (30) via the respective longitudinal warp threads and transverse weft threads so that a textile fabric-body (12) is formed having a binding pattern in which:
- the longitudinal warp threads of the first thread group (20) run in a longitudinal direction of the textile fabric-body (12),
- the transverse weft threads of the second thread group (30) run in a transverse direction of the textile fabric-body (12),
- the upper transverse thread (6*s*) lies between the two lower transverse threads (1*s*, 5*s*) in the longitudinal direction,
- the two lower transverse threads (5*s*, 1*s*) lie between the two further lower transverse threads (2*s*, 4*s*) in the longitudinal direction,
- the first longitudinal thread (1*k*, 3*k*) runs below the upper transverse thread (6*s*), above the two lower transverse threads (1*s*, 5*s*), and below the two further lower transverse threads (2*s*, 4*s*), and
- the second longitudinal thread (2*k*) runs below the two lower transverse threads (1*s*, 5*s*) and above the upper transverse thread (6*s*), and
- the third longitudinal thread (4*k*) runs below the two lower transverse threads (1*s*, 5*s*) and above the two further lower transverse threads (2*s*, 4*s*), wherein the first thread group (20) and the second thread group (30) are linked/combined with each other via the respective longitudinal warp threads and transverse weft threads such that force redirection structures (40) running in the transverse direction are formed:

i. alternately on one side and another side of the textile fabric-body (12) with a respective offset in the longitudinal direction, or ii. on one side of the textile fabric-body (12) with a respective offset in the longitudinal direction, wherein each respective force redirection structure (40) is designed so as to cause, under force application, at least one force redirection at least in the longitudinal direction of the textile fabric-body (12).

5. The method according to claim 4, wherein the second thread group (30) of transverse weft threads includes two even lower transverse threads (3*s*), and the first thread group (20) and the second thread group (30) are linked/combined with each other via the respective longitudinal warp threads and transverse weft threads such that:

the two further lower transverse threads (2*s*, 4*s*) lie between the two even lower transverse threads (3*s*) in the longitudinal direction, the first longitudinal thread (1*k*, 3*k*) runs above the two even lower transverse threads (3*s*), and the third longitudinal thread (4*k*) runs below the two even lower transverse threads (3*s*).

6. The textile woven fabric (10) according to claim 1, wherein:

the second thread group (30) of transverse weft threads includes two even lower transverse threads (3*s*), between which the two further lower transverse threads (2*s*, 4*s*) lie in the longitudinal direction, the first longitudinal thread (1*k*, 3*k*) runs above the two even lower transverse threads (3*s*), and the third longitudinal thread (4*k*) runs below the two even lower transverse threads (3*s*).

* * * * *